United States Patent
Edwards et al.

[11] Patent Number: 6,130,273
[45] Date of Patent: Oct. 10, 2000

[54] SOLVENTLESS PAINT COMPOSITION OF RESINS SUITABLE FOR APPLICATION AS A HOT MELT

[75] Inventors: Roger Owen Edwards, Frankston; Gregory Ian Foster, Richmond; Kevin Hilton Green, Lane Cove; Garry Michael McKay, Strathmore, all of Australia

[73] Assignees: Taubmans Proprietary Limited; John Lysaght (Australia) Limited, both of New South Wales, Australia

[21] Appl. No.: 08/219,551

[22] Filed: Mar. 29, 1994

Related U.S. Application Data

[63] Continuation of application No. 07/967,877, Oct. 29, 1992, abandoned.

[30] Foreign Application Priority Data

Oct. 29, 1991 [AU] Australia ............................ PK9193
Jul. 7, 1992 [AU] Australia ............................ PL3383

[51] Int. Cl.$^7$ .................. C08J 3/20; C08K 3/10; C08K 31/00
[52] U.S. Cl. .................. 523/351; 524/500; 524/507; 524/509; 523/206; 523/515; 523/516
[58] Field of Search ............... 524/507, 509, 524/514, 515, 430, 492, 493, 494, 500; 525/108, 194, 214, 221, 444, 444.5; 264/330, 331.11; 523/351, 204, 206, 401, 427, 442, 515, 516

[56] References Cited

U.S. PATENT DOCUMENTS

| | | | |
|---|---|---|---|
| 3,917,123 | 11/1975 | Grenfell | 222/146 HE |
| 4,028,458 | 6/1977 | Wallace | 264/148 |
| 4,129,488 | 12/1978 | McGimmies | 204/159.19 |
| 4,510,284 | 4/1985 | Gimpel et al. | 524/379 |
| 4,857,579 | 8/1989 | Domeir | 524/507 |
| 4,988,767 | 1/1991 | Pettit, Jr. | 524/194 |
| 4,990,364 | 2/1991 | Bolte et al. | 427/44 |
| 5,098,952 | 3/1992 | Blasko et al. | 525/123 |
| 5,098,956 | 3/1992 | Blasko et al. | 525/123 |

FOREIGN PATENT DOCUMENTS

| | | |
|---|---|---|
| 28 22 39 | 1/1966 | Australia . |
| 40 310 | 4/1973 | Australia . |
| 44568 | 1/1974 | Australia . |
| 44610 | 1/1974 | Australia . |
| 50926 | 7/1974 | Australia . |
| 61780 | 4/1975 | Australia . |
| 2 151 637 | 7/1985 | United Kingdom . |
| 2 175 594 | 2/1986 | United Kingdom . |

OTHER PUBLICATIONS

Patents Abstracts of Japan, JP 61–87767, C–371, p. 62, May 6, 1986.
Patents Abstracts of Japan, JP 61–87768, C–371, p.63, May 6, 1986.
Patents Abstracts of Japan, JP 61–106676, C–375, p. 159, May 24, 1986.
Patents Abstracts of Japan, JP 61–111380, C–377, p. 35, May 29, 1986.
Patents Abstracts of Japan, JP 51–134729, C–76, p. 1024, Nov. 22, 1976.
Patents Abstracts of Japan, JP 51–125117, C–76, p. 550, Nov. 1, 1976.
Patents Abstracts of Japan, JP 51–125114, C–76, p. 549, Nov. 1, 1976.

*Primary Examiner*—James J. Seidleck
*Assistant Examiner*—U. K. Rajguru
*Attorney, Agent, or Firm*—Arent, Fox Kintner Plotkin & Kahn

[57] ABSTRACT

The present invention discloses solventless composition suitable for application as a hot melt to a substrate, said composition comprising a mixture or alloy of resins, selected such that the averaged glass transition temperature (Tg) of the combined unreacted resins is greater than −30° and less than +60° C. The melt viscosity of the unreacted resins are selected so that the combined resin mix has a melt viscosity of from about 0.05 to 25 Poise when measured at 180° C. and at a shear rate of 10,000 Hz.

61 Claims, No Drawings

SOLVENTLESS PAINT COMPOSITION OF RESINS SUITABLE FOR APPLICATION AS A HOT MELT

This is a continuation of application Ser. No. 07/967,877 filed Oct. 29, 1992 now abandoned.

This invention relates to a composition for use as a surface coating and more particularly to a solventless composition of use for coating steel strip, e.g. galvanized or ZINCALUME* coated strip and the like, by a hot melt technique. The invention extends to include methods of manufacture of the composition, to the composition when applied to a substrate and to a substrate when coated with the composition, or cured composition.

The invention will be herein described with particular reference to its use for online coating of metallic sheet and strip e.g. coil stock, but it will be understood that the invention is not limited to that application or to use with any particular substrate.

Decorative and protective coatings are typically applied to metallic sheet and strip e.g. galvanized or ZINCALUME coated coil stock, by coating the stock with solvent-based or water-based paints by means of a roller coater. The coated stock is then heated to remove solvent and is baked to harden the resin base. This process suffers from the disadvantages of high material cost, of high energy cost (to run driers, baking ovens and after burners) and of high capital cost for drying equipment and solvent recovery. In addition, the handling of solvents involves potential environmental and health hazards. Furthermore, solvent-based and water-based systems entail high costs in changeover of a * Registered Trade Mark production line from applying one colour to applying another because cleandown is labour intensive.

The finished coating is required to meet exacting standards of flexibility, durability, appearance and the like.

Powder coat systems have been suggested as a means to overcome some of the problems associated with conventional coating systems. Powder coatings are applied to the substrate as dry particles, usually by electrostatic spraying techniques, and then fused in situ to form a continuous film. Powder coating compositions typically consist of thermosetting polyester, epoxy, or acrylic resins of inherently high viscosity and high glass transition temperature (Tg). High glass transition temperature (Tg) resins are preferred for powder coatings because the higher the Tg, the harder the coating, and the easier the manufacture and application of the powder coating. Typical powder coating compositions have a high melt viscosity (80 poise or more when measured at 180° C.). Conveniently low Tg resins tend to be avoided in powder coatings because they tend to be sticky and to agglomerate or coalesce on storage, clog spray guns and so are unsuitable for spray application. In addition the low viscosity of such resins can make it difficult to pigment them resulting in low gloss coatings with less than optimum binding power. Powder coatings suffer from a number of inherent disadvantages including that they are difficult to apply uniformly at low film thickness for example at below about 50 micron film thickness and especially at below about 25 micron film thickness. These difficulties are exacerbated if it is desired to apply a powder coating online to a continuous strip which may be being processed at speeds of for example 20 to 200 meters per minute and no satisfactory means is available which would enable powder coatings to be uniformly applied at high speeds. Furthermore, conventional powder coatings tend to result in a film which is deficient in flexibility or resistance to exterior weathering or in the combination of those properties.

The present invention relates to a novel solventless coating composition which can be applied as a hot melt rather than as a powder coating and which avoids or at least ameliorates the above discussed disadvantages of coatings of the prior art.

An object of the preferred embodiments of the invention is the provision of a solventless coating which is capable of application as a hot melt with uniform pigment dispersion and which may be cured to form a thin, smooth film of superior flexibility and/or durability in comparison with conventional powder coatings.

According to a first aspect, the invention consists of a solventless composition suitable for application as a hot melt to a substrate, said composition comprising a mixture or alloy of resins selected such that the averaged glass transition temperature (Tg) of the combined unreacted resins is greater than $-30°$ C. and less than $+60°$ C. Preferred embodiments of the invention have a combined resin mix melt viscosity of from about 0.05 to 25 P (Poise) when measured at 180° C. and at a shear rate of 10,000 Hz. Desirably, at least one of the resins has a pigment dispersed therein.

More preferably, the combined unreacted resins have an averaged Tg of from $-10°$ C. to $+40°$ C.

Most preferably, the composition comprises at least one resin having a glass transition temperature greater than about $+20°$ C. and another having a glass transition temperature of less than about $+20°$ C.

In a highly preferred embodiment of the invention the pigment is dispersed in at least one high Tg resin by means of an extruder and the resin containing the pigment dispersion is combined with at least one resin having a low Tg by means of the extruder at a port downstream of the high Tg resin.

In highly preferred embodiments of the invention, the resin mix melt has a viscosity of from 0.1 to 12 P at 180° C. at a shear rate of 10,000 Hz.

It is desirable that the high Tg resin should have a viscosity greater than 6 Poise.

Unless otherwise specified, all viscosity measurements to which reference is herein made are carried out at 180° C. at a shear rate of 10,000 Hz (conveniently measured on an ICI cone and plate viscometer). It will be understood however, that equivalent resins may be measured under different conditions and may be applied at different temperatures.

According to a second aspect, the invention consists in a method of manufacture of a composition for application as a surface coating to a substrate, said method comprising the steps of:

1) dispersing a pigment in a first resin having a glass transition temperature (Tg) of greater than $+20°$ C. and
2) subsequently combining with the first resin a second resin having a Tg of less than 20° C. whereby to produce a mixture or alloy having a Tg of from $-30°$ C. to $+60°$ C. Desirably, the viscosity and mix ratios of said first and second resins are selected so that the combined resin mix has a melt viscosity of from about 0.05–25 P (more preferably 0.1 to 12 P).

For a low-gloss finish, silica may be desirably incorporated in the mixture or alloy by addition to the extruder downstream of the high Tg resin or as a dispersion in the low Tg resin.

Various embodiments of the invention will now be more particularly described by way of example only.

According to a preferred embodiment of the invention, there is provided a solventless solid surface coating composition. By "solventless" is meant that the composition does not rely on solvents as a vehicle for application, and preferably is substantially free of solvents. The term is not intended to exclude the possible presence of small amounts of solvents e.g. occluded in resins from a resin manufacturing process, nor does it exclude volatile by-products produced by the cross-linking reaction during paint application and curing.

The composition is preferably a solid composition at ambient temperature and is capable of being cast as a block. The term "solid" is herein used to include glass like materials which will flow at ambient temperature over a period of hours. However, the invention is not limited to solid materials and in less preferred embodiments includes resins which are viscous liquids at ambient temperature.

Solid compositions according to the invention are capable of being applied as a thin film to a metal sheet, for example by being pressed onto a heated moving sheet of metal or as a melt. The thin film, when cured, provides a surface coating which is of satisfactory durability and flexibility and is of low cost having regard to materials and application costs.

In other embodiments the composition may be preheated and may be allowed to flow or may be extruded onto the surface or may be pelletized and melted on the surface.

Preferably, at least one "high" Tg resin has a Tg of above 20° C. and more preferably above 30° C. Desirably, the Tg of this resin is not greater than 110° C. and for preference is below 70° C. The higher the Tg of the resin, the easier paint manufacture is, but too high a Tg makes it difficult to formulate a resin of suitably low viscosity. It is important for application at high production speeds that the paint melt quickly to an application viscosity when brought into contact with the substrate and be able to be spread uniformly. Also, the higher the Tg of the resin the more difficult it is to achieve a suitably low melt flow viscosity in an acceptably short time.

At least one "low" Tg resin has a Tg of below 20° C. and more preferably below 5° C. The "low" Tg resin preferably has a Tg of above −100° C. and more preferably above −60° C. The ratio of high to low Tg resins is selected so that the combination has an averaged Tg and melt viscosity in the above discussed desired range.

The glass transition temperatures referred to are as measured by a differential scanning calorimeter.

It will be understood that the Tg of the combined resins is not necessarily the mathematical average of the Tg of component resins, or the weighted average of the component resins. In some cases, an alloy or eutectic mixture may be formed, while in other cases the resins will combine to produce a single broad spectrum glass transition temperature.

In yet other cases the glass transition temperature of the combination may be a weighted average of distinct transition temperatures.

When the paint is applied by bringing a solid body of paint into contact with a preheated metal surface, for example a strip at 100° C. to 250° C. or higher and travelling at e.g. 100 to 250 meters per minute, then it is important that the application viscosity be sufficiently low to provide rapid coverage of the surface, to facilitate smoothing and desirably to provide a uniform thin film. If the viscosity is too low, the film may lack integrity or may be difficult to smooth and there may be edge and "spray" wastage.

If the application viscosity is too great then it is difficult to obtain sufficiently thin even coatings. In addition, if elevated application temperatures (for example 280° C.–300° C.) are used to achieve a low application viscosity, the increase in viscosity due to resin cross-linking may occur at a rate such as to prevent or render difficult adequate smoothing out of the coating.

Preferably, the high Tg resin is selected to have a viscosity of from 5 to 25 P and more preferably from 6 to 12 P. The low Tg resin preferably has a viscosity of from 0.1 to 7 P and more preferably from 0.2 to 4 P.

The higher the combined resin melt viscosity of the resin, the easier is dispersion of pigment using conventional extruding apparatus but viscosity above 25 P at 180° C. leads to problems with application of the paint composition as a hot melt. Thus, preferably, the combined resin melt viscosity is selected to give a pigmented paint having a viscosity of from 0.05 to 25 P and more preferably from 0.1 to 12 P measured at 180° C. and at a shear rate of 10,000 Hz. The preferred selected viscosity ranges enable easy manufacture of the resin with pigment dispersion in the high Tg resin and application of the paint with uniform film thickness.

Types of resin which may be used include:

Polyester

Silicone modified polyester

Acrylic

Alkyd

Epoxy

Melamine-formaldehyde

Urea-formaldehyde

Phenol-formaldehyde

Fluorinated polymers

Chlorinated polymers

Urethane resins and crosslinkers

Elastomers

The resins of the composition may be of the same type, or resins of one type may be combined with resins of another type. For example, a high Tg polyester resin may be combined with a low Tg silicone modified polyester; a high Tg polyester may be combined with a low Tg Melamine Formaldehyde or urea formaldehyde resin, and so on.

Silica is normally employed to reduce the gloss of topcoats but typically cannot be introduced into an extruder in the same way as pigments as it receives too high a shear during processing to efficiently reduce the gloss.

In one embodiment of the present invention, the silica is introduced by means of a twin or multi port extruder. Pigment is introduced at the upstream port. The silica is fed into the extruder through a port situated near the end of the extruder barrel, that is to say at a port downstream from that at which pigment and high Tg resin is admitted. The silica is thus introduced after the pigment has been substantially dispersed. The low Tg resin or resins, heat sensitive cross-linking resins, additives and the like can also be added via the second or subsequent port.

Alternatively, the silica and/or other additives are pre-combined with the low Tg resin, for example in a high speed mixer and the low Tg resin mixture is then combined with the high Tg resin, for example, at the downstream port of the extruder.

In this way, the silica does not undergo high shear forces. The use of a twin or multi port extruder for paint manufacture is also believed to be a novel aspect of preferred embodiments of the invention.

EXAMPLE 1

High Gloss Paint (A) A High Tg Polyester Resin was Manufactured as Follows 111 parts of trimethylol propane, 381 parts of neopentyl glycol, 292 parts of phthalic anhydride, and 327 parts of isophthalic acid were mixed together in a reaction vessel equipped with a nitrogen purge, a stirrer, a thermometer, fractionating column and water take-off condenser. The reactants were heated up to a temperature of 240° C. at a rate to maintain the column head temperature at less than 102° C. 105 parts of water was removed during this process until the resin reached an acid value of 4.

The resin was then poured onto cooling bands and broken up into a convenient chip size. The chips remained stable without recombining for a period of six months at ambient temperatures.

The resin had a Tg of 34° C. and a viscosity of 7.6 P at 180° C.

(B) Manufacture of Low Tg Resin 26 parts of trimethylol propane, 543 parts of neopentyl glycol, 715 parts of adipic acid were mixed together in the same sort of reaction vessel described above. The resin was processed to an acid value of 8, producing 120 parts of water. This resin was cooled to a viscous liquid at 25° C.

The resin had a Tg of −46° C. and a viscosity of 0.5 P at 180° C.

(C) Manufacture of 100% Solids Polyester Paint (Full Gloss)

The above two resins were used to produce a 100% active paint by the following procedure.

204 parts of Titanium Dioxide, 60 parts of mixed metal oxide coloured pigments, 226 parts of a Caprolactam blocked Isophorone Diisocyanate crosslinker, 9 parts acrylic flow modifier, 1.5 parts wax powder and 360 parts high Tg resin (as described above) were extruded at a temperature of 120° C. through a Buss Kneader PLK46 extruder. Pigment dispersion of 15 micrometers topsize was achieved.

The resultant material was melt blended with 140 parts of the low Tg Polyester resin (as described above) plus 3.5 parts Dibutyl Tin dilaurate catalyst at a temperature of 120° C.

The melt blend system was thoroughly mixed and allowed to cool to room temperature.

The final material can be chipped as a solid at ambient temperatures and has a melt viscosity at 200° C. of 2.0 P but cannot yield a stable powder using conventional equipment.

This product is a full gloss system.

EXAMPLE 2

Semi Gloss Paint

A 100% solids polyester paint was manufactured as in Example 1 with the additional step that in step (c), 50 parts of silica were predispersed in the low Tg resin by high speed stirring prior to the melt blend phase.

EXAMPLE 3

Application to ZINCALUME Coil

The 100% Solids Polyester paint of Example 1 or Example 2 was formed into a block shape by melting at temperatures greater than 60° C. in a suitably shaped mould and then cooled to 25° C.

The solid block was then pressed onto a moving sheet of metal which was heated to a temperature of 160° C. The high temperature of the metal sheet melted the surface of the paint block in contact with it and ensured a smooth even coating of the sheet. The coated sheet was then baked to a peak metal temperature of 235° C. to fully cure the thermosetting paint. If desired, smoothing apparatus such as a doctor blade, air curtain or roller may be used downstream of the melt application point prior to final cure.

Properties of a Coating According to the Invention

A solid coating of the paint of Example 1 applied as described in Example 3 to primed ZINCALUME sheet showed the following properties:

| | |
|---|---|
| Flexibility | Pass 1-2T |
| Reverse Impact | Pass 18 joules |
| Pencil Hardness | H |
| Durability | Very good |
| Film thickness | 20 micrometers |
| Cured Film Tg | 44° C. |

The solid coating of Example 1 has also been applied to other metallic substrates such as cold rolled steel, aluminium, hot dipped galvanised steel and unprimed ZINCALUME steel. Coatings over all these substrates produced flexible, glossy, well adhered films.

EXAMPLE 4

(a) A high Tg polyester resin was manufactured as follows: 3838 parts of neopentyl glycol, 189 parts of trimethylol propane, 2560 parts of phthalic anhydride and 2871 parts of isophthalic acid were combined in a reaction vessel equipped with a nitrogen purge, a stirrer, a thermometer, a fractionating column and a water take-off condenser. The reactants were heated up to 240° C. at such a rate that the column head temperature did not exceed 102° C. 912 parts of water were removed during this process until the resin reached an acid value of 8. The resin was then poured onto cooling bands and broken up into a convenient chip size. The resin had a Tg of 37° C. and a viscosity of 5.0 P at 200° C.

(b) Manufacture of 100% solids polyester paint. 204 parts titanium dioxide, 47 parts of mixed metal oxide coloured pigments, 9 parts acrylic flow modifier, 1.5 parts wax powder and 421 parts of the High Tg resin described above were extruded at a temperature of 115° C. through a Buss Kneader PLK46 extruder to achieve 15 micrometers topside dispersion.

The resultant material was melt blended with a pre-blended mixture of 166 parts of the low Tg resin described in example 1, 147 parts hexamethyl methoxy melamine resin of Tg approximately −40° C. and 2 parts para-toluene sulfonic acid at a temperature of 100° C.

The melt blended material was thoroughly mixed and chilled in a refrigerator at 4° C. The final chilled material can be chipped as a solid and formed into a block at above ambient temperatures.

The resultant material, applied to metal strip as per example 3, produced a well crosslinked and adhered, flexible film with high gloss and smooth appearance.

EXAMPLE 5

(a) A high Tg polyester was manufactured as follows: 1126 parts of neopentyl glycol, 482 parts of trimethylol propane, and 1652 parts of isophthalic acid were mixed together in a reaction vessel equipped with a nitrogen purge, a stirrer, a thermometer, a fractionating column and a water take-off condenser. The reactants were heated up to a temperature of 210° C. at such a rate that the column head temperature did not exceed 102° C. The temperature was maintained until the solution went clear and approximately 300 parts of water was removed. The temperature was dropped back to 160° C. and 1473 parts of phthalic anhydride was added. The reactants were heated to 220° C. at such a rate to maintain the column head temperature at less than 102° C. The temperature was maintained at 220° C. until an acid value of 105 was reached and a total of 392 parts of water was removed. The resin was then poured onto cooling bands and broken up into convenient chip sizes.

The resin had a Tg and a viscosity of 9.8 P at 200° C. of 45° C. and was essentially carboxylic acid functional whereas the polyester resins in examples 1 and 4 were hydroxyl functional.

(b) A low Tg resin was manufactured as follows:—818 parts of neopentyl glycol, 47 parts of trimethylol propane and 1344 parts of adipic acid were combined in a reaction vessel as described for the high Tg resin. The resin was processed at 235° C. to an acid value of 63.4 producing 293 parts of water. This resin was cooled to a viscous liquid at 25° C. It has a Tg of approximately −40° C. and a viscosity of 0.5 P at 200° C.

(c) Manufacture of 100% solids polyester paint.

The two resins were used to produce a 100% solids paint by the following procedure:

200 parts titanium dioxide, 53 parts of mixed metal oxide coloured pigments, 9 parts acrylic flow modifier, 1.5 parts wax powder, 460 parts of the high Tg resin described above and 75 parts Primid XL552 (a tetrafunctional β-hydroxy-aklylamide) were extruded at a temperature of 125° C. through a Buss Kneader PLK46 extruder.

The resultant material was melt blended at 130° C. with 194 parts of the low Tg resin described above and mixed thoroughly. The final material was allowed to cool to room temperature and chipped as a solid at ambient temperature.

The final material has a melt viscosity of 2 P at 200° C.

Applied to metal strip as per example 3, it produced a well crosslinked and adhered, flexible film with high gloss and a smooth appearance.

EXAMPLE 6

(a) Manufacture of a 100% solids primer coating.

The two polyester resins described in Example 5 and a high Tg epoxy resin were used to prepare a 100% solids paint for use as a metal primer.

74 parts Kaolin Clay, 182 parts titanium dioxide, 171 parts of aluminium triphosphate anti-corrosive pigment, 142 parts of the high Tg resin described in Example 5 and 285 parts of bisphenol A diglycidyl ether epoxy resin with an average epoxy equivalent weight of 900 and Tg of 49° C. were extruded at 110° C. through a Buss Kneader extruder.

The resultant material was melt blended with 142 parts of the low Tg resin described in Example 5 at 100° C. and thoroughly mixed. The material was allowed to chill in a refrigerator at 4° C. The chilled product can be chipped as a solid.

This coating, applied at 5 micrometers film build on ZINCALUME metal substrate as per Example 3, produced a crosslinked well adhered anti-corrosive primer film.

In general, it will be understood that paints according to the invention may be supplied either as a solid or semi-solid or may be supplied as two parts, one part comprising a solid high Tg resin in which pigment is dispersed and a second part being a liquid low Tg resin, the parts being combined prior to application.

Although it is preferred to disperse the pigment in a high Tg resin which is then combined with a low Tg resin, in less preferred embodiments the pigment may be dispersed in the low Tg resin (e.g. in a high speed mixer) prior to combining the resins.

Paints according to the invention may be manufactured and/or applied by other means.

The solventless paints according to the invention manufactured and applied to continuous metal strip have a superior flexibility and/or resistance to exterior weathering compared to powder coatings and do not suffer from the cost and environmental hazards of traditional solvent based paints.

What is claimed is:

1. A thermosettable paint composition suitable for application from a solid block thereof as a hot melt to a substrate heated to a temperature which is hot enough to melt a surface portion of said solid block upon contact therewith, said composition comprising:

a pigment; and a thermosettable mixture of resins, having an averaged glass transition temperature (Tg) of greater than −30° C. and less than +60° C. and having a melt viscosity of from about 0.1 to 12 poise when measured at 180° C. and at a shear rate of 10,000 Hz;

wherein said mixture of resins comprises:

a first resin having a glass transition temperature $T_g$ of greater than +20° C., and a second resin having a glass transition temperature $T_g$ of below +20° C. and a melt viscosity of 0.1 to 7 poise when measured at 180° C. and at a shear rate of 10,000 Hz, wherein said pigment is dispersed in said first resin and this dispersion is admixed with at least said second resin to make said solventless paint composition.

2. A method of manufacture of a thermosettable solventless paint composition, having the ability to be applied as a hot melt from a solid block comprising said composition onto a substrate in contact with said block which substrate has been heated to a temperature hot enough to melt a surface portion of said solid block within the time that said substrate is in contact with said block, comprising the steps of:

(i) selecting a first resin having a glass transition temperature ($T_g$) greater than +20° C., (ii) selecting a second resin having a glass transition temperature ($T_g$) less than +20° C. and a melt viscosity of 0.1 to 7 poise when measured at 180° C. and at a sheer rate of 10,000 Hz, wherein at least one of said first and second resins is thermosettable.

(iii) dispersing a pigment in the first resin to form a pigmented first resin, and (iv) combining the pigmented first resin and the second resin in proportions such that the glass transition temperature ($T_g$) of the combined mixture of resins is greater than −30° C. and less than ±60° C., and such that the combined mixture of resins has a melt viscosity of about 0.1 to 12 poise when measured at 180° C. and at a shear rate of 10,000 Hz to thereby form said solventless paint composition.

3. A solventless thermosetting paint composition suitable for application as a hot melt to a substrate, said composition comprising:

a pigment; and a mixture of resins having an average glass transition temperature (Tg) greater than −30° C. and less than +60° C. and having a melt viscosity of from about 0.05 to 25 Poise when measured at 180° C. and at a shear rate of 10,000 Hz;

wherein said mixture of resins comprises:

a first resin having a glass transition temperature (Tg) of greater than +20° C., and a second resin having a glass transition temperature Tg of below +20° C. and a melt viscosity of 0.1 to 7 Poise when measured at 180° C. and at a shear rate of 10,000 Hz, wherein said pigment is dispersed in said first resin and this dispersion is admixed with at least said second resin to make said solventless thermosetting paint composition.

4. A composition according to claim 1 wherein one of the resins has a Tg of above 30° C. and less than 110° C. and another has a Tg of below 5° C. and above −100° C.

5. A composition according to claim 4 wherein one of the resins has a Tg of greater than 30° C. and less than 70° C. and another resin has a Tg of below 5° C. and above −60° C.

6. A composition according to claim 1 wherein the combined unreacted resins have an averaged Tg of from −10° C. to +40° C.

7. A composition according to claim 1 wherein the pigment is dispersed in a resin component having a Tg of above 20° C. and a viscosity greater than 6 P at 180° C.

8. A composition according to claim 1 wherein the resins are selected from the group consisting of polyesters, silicone modified polyesters, acrylic, alkyd, epoxy, melamine-formaldehyde, urea-formaldehyde, phenol-formaldehyde, fluorinated polymers, chlorinated polymers, and urethane resins.

9. A composition according to claim 8 wherein at least one of the resins is a polyester resin.

10. A method according to claim 2 wherein the step of dispersing is conducted in an extruder.

11. A method according to claim 10 wherein the extruder is a multi port extruder and wherein the first resin is admitted at a first port and silica is introduced to the resin at a second port downstream from the first port.

12. A method according to claim 11 wherein silica is combined with the second resin prior to combination of the second resin with the first.

13. A method according to claim 2 wherein the first resin has a Tg of above 30° C. and below 110° C.

14. A method according to claim 2 wherein the first resin has a melt viscosity of greater than 6 P at 180° C.

15. A method according to claim 2 wherein the second resin has a Tg of below 5° C. and above −60° C.

16. A method according to claim 2 wherein the first resin is selected from the group consisting of polyesters, silicone modified polyesters, acrylic, alkyd, epoxy, melamine-formaldehyde, urea-formaldehyde, phenol-formaldehyde, fluorinated polymers, chlorinated polymers, and urethane resins.

17. A method according to claim 2 wherein the second resin is independently selected from the group consisting of polyesters, silicone modified polyesters, acrylic, alkyd, epoxy, melamine-formaldehyde, urea-formaldehyde, phenol-formaldehyde, fluorinated polymers, chlorinated polymers, and urethane resins.

18. A composition according to claim 3 wherein the first resin has a (Tg) of from 20° C. to 70° C. and a viscosity of from 5 to 25 Poise when measured at 180° C. and at a shear rate of 10,000 Hz.

19. A composition according to claim 3 wherein the second resin has a viscosity of from 0.2 to 4 Poise when measured at 180° C. and at a shear rate of 10,000 Hz.

20. A composition according to claim 18 wherein the first resin has a viscosity of from 6 to 12 Poise when measured at 180° C. and at a shear rate of 10,000 Hz.

21. A composition according to claim 3 wherein the resins are selected from the group consisting of polyesters, silicone modified polyesters, acrylic, alkyd, epoxy, melamine-formaldehyde, urea-formaldehyde, phenol-formaldehyde, fluorinated polymers, chlorinated polymers, and urethane resins.

22. A composition according to claim 21 wherein the first or second resin is a polyester resin.

23. A method of manufacture of a solventless thermosetting paint composition, comprising the steps of:
 (i) selecting a first resin having a glass transition temperature (Tg) greater than +20° C.,
 (ii) selecting a second resin having a glass transition temperature (Tg) less than +20° C. and a melt viscosity of 0.1 to 7 Poise when measured at 180° C. and at a shear rate of 10,000 Hz,
 (iii) dispersing a pigment in the first resin to form a pigmented first resin, and
 (iv) combining the pigmented first resin and the second resin in proportions such that the glass transition temperature (Tg) of the combined mixture of resins is greater than −30° C. and less than +60° C., and such that the combination mixture of resins has a melt viscosity of about 0.05 to 25 Poise when measured at 180° C. and at a shear rate of 10,000 Hz to thereby form said solventless thermosetting paint composition.

24. A method according to claim 23 wherein the first resin has a viscosity of from 5 to 25 Poise when measured at 180° C. and at a shear rate of 10,000 Hz.

25. A method according to claim 24 wherein the first resin has a viscosity of from 6 to 12 Poise.

26. A method according to claim 23 wherein the second resin has a viscosity of from 0.2 to 4 Poise when measured at 180° C. and at a shear rate of 10,000 Hz.

27. A method according to claim 23 wherein the step of dispersing is conducted in an extruder.

28. A method according to claim 27 wherein the extruder is a multi-port extruder and wherein the first resin is admitted at a first port and silica is introduced into admixture with the first resin at a second port downstream from the first port.

29. A method according to claim 28 wherein said silica is combined with the second resin prior to combination of the second resin with the first resin.

30. A method according to claim 23 wherein the first resin has a Tg of above 30° C. and below 110° C.

31. A method according to claim 23 wherein the second resin has a Tg of below 5° C. and above −60° C.

32. A method according to claim 23 wherein the first resin is at least one member selected from the group consisting of polyesters, silicone modified polyesters, acrylic, alkyd, epoxy, melamine-formaldehyde, urea-formaldehyde, phenol-formaldehyde, fluorinated polymers, chlorinated polymers, and urethane resins.

33. A method according to claim 23 wherein the second resin is independently selected from the group consisting of at least one of polyesters, silicone modified polyesters, acrylic, alkyd, epoxy, melamine-formaldehyde, urea-formaldehyde, phenol-formaldehyde, fluorinated polymers, chlorinated polymers, and urethane resins.

34. A solventless thermosetting paint composition suitable for application as a hot melt to a substrate, said composition comprising a mixture of resins having an average glass transition temperature (Tg) greater than −30° C. and less than +60° C. and having a melt viscosity of from about 0.1 to 12 Poise when measured at 180° C. and at a shear rate of 10,000 Hz, wherein at least one of the resins has a Tg of below 20° C. and a viscosity of from 0.1 to 7 Poise when measured at 180° C. and at a shear rate of 10,000 Hz.

35. A composition according to claim 34 wherein at least one resin of the mixture has a Tg of from 20° C. to 70° C.

36. A composition according to claim 34 wherein the resin having a Tg below 20° C. has a viscosity of from 0.2 to 4 Poise when measured at 180° C. and at a shear rate of 10,000 Hz.

37. A composition according to claim 35 wherein the resin having a Tg of from 20° C. to 70° C. has a viscosity of from 6 to 12 Poise when measured at 180° C. and at a shear rate of 10,000 Hz.

38. A composition according to claim 35 wherein the resin having a Tg of from 20° C. to 70° C. has a pigment dispersed therein.

39. A composition according to claim 34 wherein the resins are independently selected from the group consisting of at least one member selected from polyesters, silicone modified polyesters, acrylic, alkyd, epoxy, melamine-formaldehyde, urea-formaldehyde, phenol-formaldehyde, fluorinated polymers, chlorinated polymers, and urethane resins.

40. A composition according to claim 39 wherein at least one of the resins is a polyester resin.

41. A method of manufacture of a solventless thermosetting paint comprising the steps of:
   (i) selecting a first resin having a glass transition temperature (Tg) greater than +20° C.,
   (ii) selecting a second resin having a Tg less than +20° C. and a melt viscosity of 0.1 to 7 Poise when measured at 180° C. and at a shear rate of 10,000 Hz, wherein at least one of said resins is thermosetting;
   (iii) dispersing a pigment in the first resin to form a pigmented first resin, and
   (iv) combining the pigmented first resin and the second resin in proportions such that the Tg of the combined mixture of resins is greater than −30° C. and less than +60° C., and such that the combined mixture of resins has a melt viscosity of about 0.01 to 12 Poise when measured at 180° C. and at a shear rate of 10,000 Hz.

42. A method according to claim 41 wherein the first resin has a viscosity of from 6 to 12 Poise.

43. A method according to claim 41 wherein the second resin has a viscosity of from 0.2 to 4 Poise.

44. A method according to claim 41 wherein the step of dispersing is conducted in an extruder.

45. A method according to claim 44 wherein the extruder is a multi-port extruder and wherein the first resin is introduced at a first port and silica is introduced into admixture with the first resin at a second port downstream from the first port.

46. A method according to claim 45 wherein silica is combined with the second resin prior to combination of the second resin with the first.

47. A method according to claim 41 wherein the first resin has a Tg of above 30° C. and below 110° C.

48. A method according to claim 41 wherein the second resin has a Tg of below 5° C. and above −60° C.

49. A method according to claim 41 wherein the first resin is at least one member selected from the group consisting of polyesters, silicone modified polyesters, acrylic, alkyd, epoxy, melamine-formaldehyde, urea-formaldehyde, phenol-formaldehyde, fluorinated polymers, chlorinated polymers, and urethane resins.

50. A method according to claim 41 wherein the second resin is independently selected from the group consisting of at least one of polyesters, silicone modified polyesters, acrylic, alkyd, epoxy, melamine-formaldehyde, urea-formaldehyde, phenol-formaldehyde, fluorinated polymers, chlorinated polymers, and urethane resins.

51. A paint composition as claimed in claim 1 in the form of a solid block so sized and shaped that one of said blocks is sufficient to, upon contact with a surface of a heated substrate, deposit a molten film on said substrate in an amount sufficient to be spread to cover said substrate surface.

52. A solid block of a thermosetting paint composition as claimed in claim 51, wherein said contact is between said block and said substrate which is moving relative to said block.

53. A composition as claimed in claim 8 wherein at least some of said resins are elastomers.

54. A method as claimed in claim 16 wherein at least some of said resins are elastomers.

55. A method as claimed in claim 17 wherein at least some of said resins are elastomers.

56. A composition as claimed in claim 21 wherein at least some of said resins are elastomers.

57. A method as claimed in claim 32 wherein at least some of said resins are elastomers.

58. A method as claimed in claim 33 wherein at least some of said resins are elastomers.

59. A composition as claimed in claim 39 wherein at least some of said resins are elastomers.

60. A method as claimed in claim 49 wherein at least some of said resins are elastomers.

61. A method as claimed in claim 50 wherein at least some of said resins are elastomers.

* * * * *